US009787379B2

(12) United States Patent
Onggosanusi et al.

(10) Patent No.: US 9,787,379 B2
(45) Date of Patent: Oct. 10, 2017

(54) METHOD AND APPARATUS FOR PRECODING CHANNEL STATE INFORMATION REFERENCE SIGNAL

(71) Applicant: Samsung Electronics Co., Ltd., Suwon-si, Gyeonggi-do (KR)

(72) Inventors: Eko Onggosanusi, Allen, TX (US); Jianzhong Zhang, Plano, TX (US); Yang Li, Plano, TX (US); Young-Han Nam, Plano, TX (US); Boon Loong Ng, Plano, TX (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 98 days.

(21) Appl. No.: 14/800,333

(22) Filed: Jul. 15, 2015

(65) Prior Publication Data
US 2016/0142115 A1 May 19, 2016

Related U.S. Application Data

(60) Provisional application No. 62/090,781, filed on Dec. 11, 2014, provisional application No. 62/080,884, (Continued)

(51) Int. Cl.
*H04W 4/00* (2009.01)
*H04B 7/0456* (2017.01)
(Continued)

(52) U.S. Cl.
CPC ........... *H04B 7/0456* (2013.01); *H04B 7/065* (2013.01); *H04B 7/0617* (2013.01); (Continued)

(58) Field of Classification Search
CPC ..... H04W 28/06; H04W 88/08; H04W 48/00; H04W 5/0048; H04W 5/0023;
(Continued)

(56) References Cited

U.S. PATENT DOCUMENTS

2013/0039203 A1* 2/2013 Fong .................. H04B 7/024
370/252
2013/0163687 A1* 6/2013 Jing .................. H04B 7/0658
375/267

(Continued)

OTHER PUBLICATIONS

International Search Report dated Feb. 29, 2016 in connection with International Application No. PCT/KR2015/012355, 3 pages.
(Continued)

*Primary Examiner* — Thai Hoang

(57) ABSTRACT

A base station includes a transceiver, and a processor configured to allocate at least one CSI-RS antenna port to a user equipment (UE), precode the at least one CSI-RS antenna port with a first precoding matrix, cause the transceiver to transmit the at least one CSI-RS antenna port precoded with the first precoding matrix through a channel to the UE, cause the transceiver to signal a number of the at least one antenna port to the UE, cause the transceiver to receive an index for a second precoding matrix from the UE, wherein the second precoding matrix is determined by the UE according to the at least one CSI-RS antenna port precoded with the first precoding matrix as received through the channel by the UE and the signaled number of the at least one antenna port, and precode transmission data with the first precoding matrix and the second precoding matrix.

17 Claims, 9 Drawing Sheets

Related U.S. Application Data filed on Nov. 17, 2014, provisional application No. 62/110,914, filed on Feb. 2, 2015.

(51) Int. Cl.
  *H04W 48/00*  (2009.01)
  *H04B 7/06*   (2006.01)
  *H04L 5/00*   (2006.01)
  *H04W 88/08*  (2009.01)
  *H04W 28/06*  (2009.01)

(52) U.S. Cl.
  CPC ......... *H04B 7/0619* (2013.01); *H04B 7/0684* (2013.01); *H04W 48/00* (2013.01); *H04L 5/0023* (2013.01); *H04L 5/0028* (2013.01); *H04L 5/0048* (2013.01); *H04W 28/06* (2013.01); *H04W 88/08* (2013.01)

(58) Field of Classification Search
  CPC . H04W 5/0028; H04B 7/0456; H04B 7/0617; H04B 7/0619; H04B 7/065; H04B 7/0684
  USPC ......... 370/312, 329–330, 335–345, 347–348
  See application file for complete search history.

(56) References Cited

U.S. PATENT DOCUMENTS

| | | | |
|---|---|---|---|
| 2013/0294369 A1* | 11/2013 | Dinan | H04L 5/001 370/329 |
| 2013/0308715 A1 | 11/2013 | Nam et al. | |
| 2014/0098689 A1* | 4/2014 | Lee | H04B 7/0469 370/252 |
| 2014/0162670 A1* | 6/2014 | Choi | H04B 7/0639 455/450 |
| 2014/0177683 A1* | 6/2014 | Krishnamurthy | H04B 7/0469 375/219 |
| 2015/0222347 A1* | 8/2015 | Xia | H04B 7/024 370/329 |

OTHER PUBLICATIONS

Written Opinion of the International Searching Authority dated Feb. 29, 2016 in connection with International Application No. PCT/KR2011/012355, 8 pages.

\* cited by examiner

METHOD AND APPARATUS FOR PRECODING CHANNEL STATE INFORMATION REFERENCE SIGNAL

CROSS-REFERENCE TO RELATED APPLICATION AND CLAIM OF PRIORITY

This application claims priority under 35 U.S.C. §119(e) to U.S. Provisional Patent Application No. 62/090,781 filed on Dec. 11, 2014. This application claims priority under 35 U.S.C. §119(e) to U.S. Provisional Patent Application No. 62/080,884 filed on Nov. 17, 2014. This application claims priority under 35 U.S.C. §119(e) to U.S. Provisional Patent Application No. 62/110,914 filed on Feb. 2, 2015. The above-identified provisional patent applications are hereby incorporated by reference in its entirety.

TECHNICAL FIELD

The present disclosure relates generally to partially precoding CSI-RS antenna ports associated with multiple transmit antennas. Such two dimensional arrays are associated with a type of multiple-input-multiple-output (MIMO) system often termed "full-dimension" MIMO (FD-MIMO) or massive MIMO or 3D-MIMO.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

In a first embodiment, a Base Station (BS) is provided. The BS includes a transceiver, a processor configured to allocate at least one CSI-RS antenna port to a User Equipment (UE), precode the at least one CSI-RS antenna port with a first precoding matrix, cause the transceiver to transmit the at least one CSI-RS antenna port precoded with the first precoding matrix through a channel to the UE, cause the transceiver to signal a number of the at least one antenna port to the UE, cause the transceiver to receive an index for a second precoding matrix from the UE, wherein the second precoding matrix is determined by the UE according to the at least one CSI-RS antenna port precoded with the first precoding matrix as received through the channel by the UE and the signaled number of the at least one antenna port, and precode transmission data with the first precoding matrix and the second precoding matrix.

In a second embodiment, a method for operating a User Equipment (UE) is provided. The method includes receiving the at least one CSI-RS antenna port precoded with the first precoding matrix through a channel from a Base Station (BS), receiving a signaling comprising a number of the at least one antenna port from the BS, determining a second precoding matrix according to the at least one CSI-RS antenna port precoded with the first precoding matrix as received through the channel by the UE, and the signaled number of the at least one antenna port, transmitting an index for the determined second precoding matrix to the BS, and receiving transmission data with the first precoding matrix and the second precoding matrix from the BS.

In a third embodiment, A User Equipment (UE) includes a transceiver, a processor configured to cause the transceiver to receive the at least one CSI-RS antenna port precoded with the first precoding matrix through a channel from a Base Station (BS), cause the transceiver to receive a signaling comprising a number of the at least one antenna port from the BS, determine a second precoding matrix according to the at least one CSI-RS antenna port precoded with the first precoding matrix as received through the channel by the UE, and the signaled number of the at least one antenna port, cause the transceiver to transmit an index for the determined second precoding matrix to the BS, and cause the transceiver to receive transmission data with the first precoding matrix and the second precoding matrix from the BS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

LIST OF ACRONYMS

2D: two-dimensional
MIMO: multiple-input-multiple-output
SU-MIMO: single-user MIMO
MU-MIMO: multi-user MIMO
3GPP: 3rd generation partnership project
LTE: long-term evolution
UE: user equipment
eNB: evolved Node B or "eNodeB"
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated into the present disclosure as if fully set forth herein: 3GPP Technical Specification (TS) 23.228 version 12.5.0, "IP Multimedia Subsystem (IMS); Stage 2"; 3GPP TS 23.216 version 12.1.0, "Single Radio Voice Call Continuity (SRVCC); Stage 2"; 3GPP Technical Requirement No. 23.706 version 0.1.1, "Study on enhancements to Web Real Time Communication (WebRTC) access to IP Multimedia Subsystem (IMS)"; 3GPP TS 23.237 version 12.7.0, "IMS Service Continuity; Stage 2"; 3GPP TS 23.203 version 12.5.0, "Policy and charging control architecture"; and 3GPP TS 23.401 version 12.5.0, "General Packet Radio Service (GPRS) enhancements for Evolved Universal Terrestrial Radio Access Network (E-UTRAN)".

Figure 1:
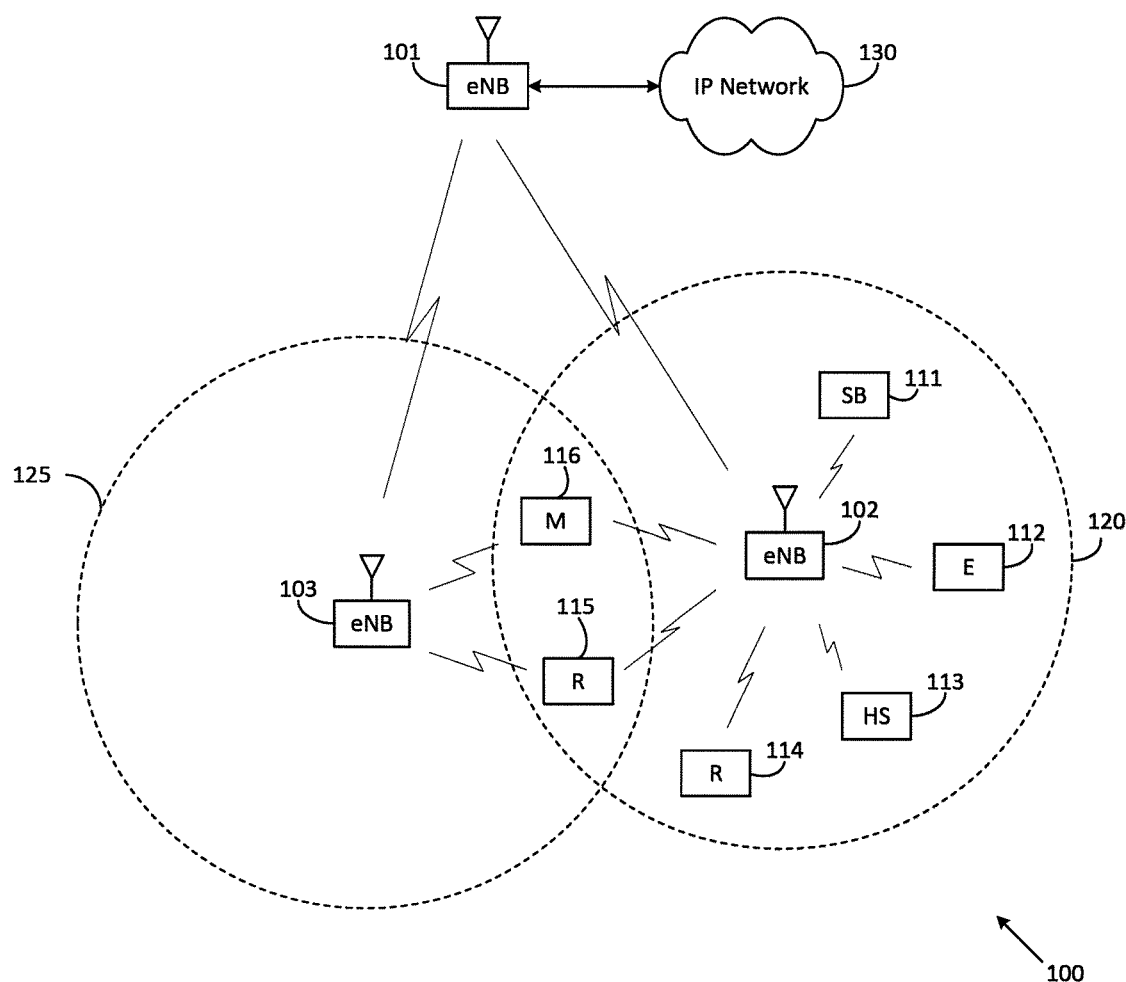
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support channel quality measurement and reporting for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
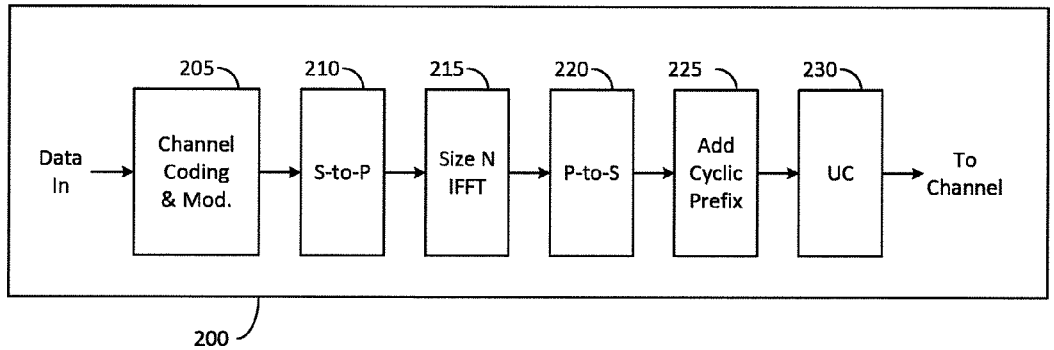
FIGS. 2A and 2B illustrate example wireless transmit and receive paths according to this disclosure.
Figure 2B:
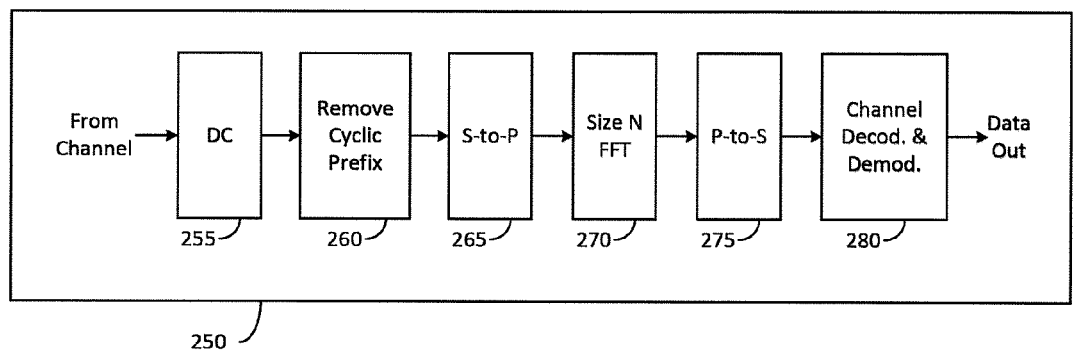

FIGS. 2A and 2B illustrate exemplary wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support channel quality measurement and reporting for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
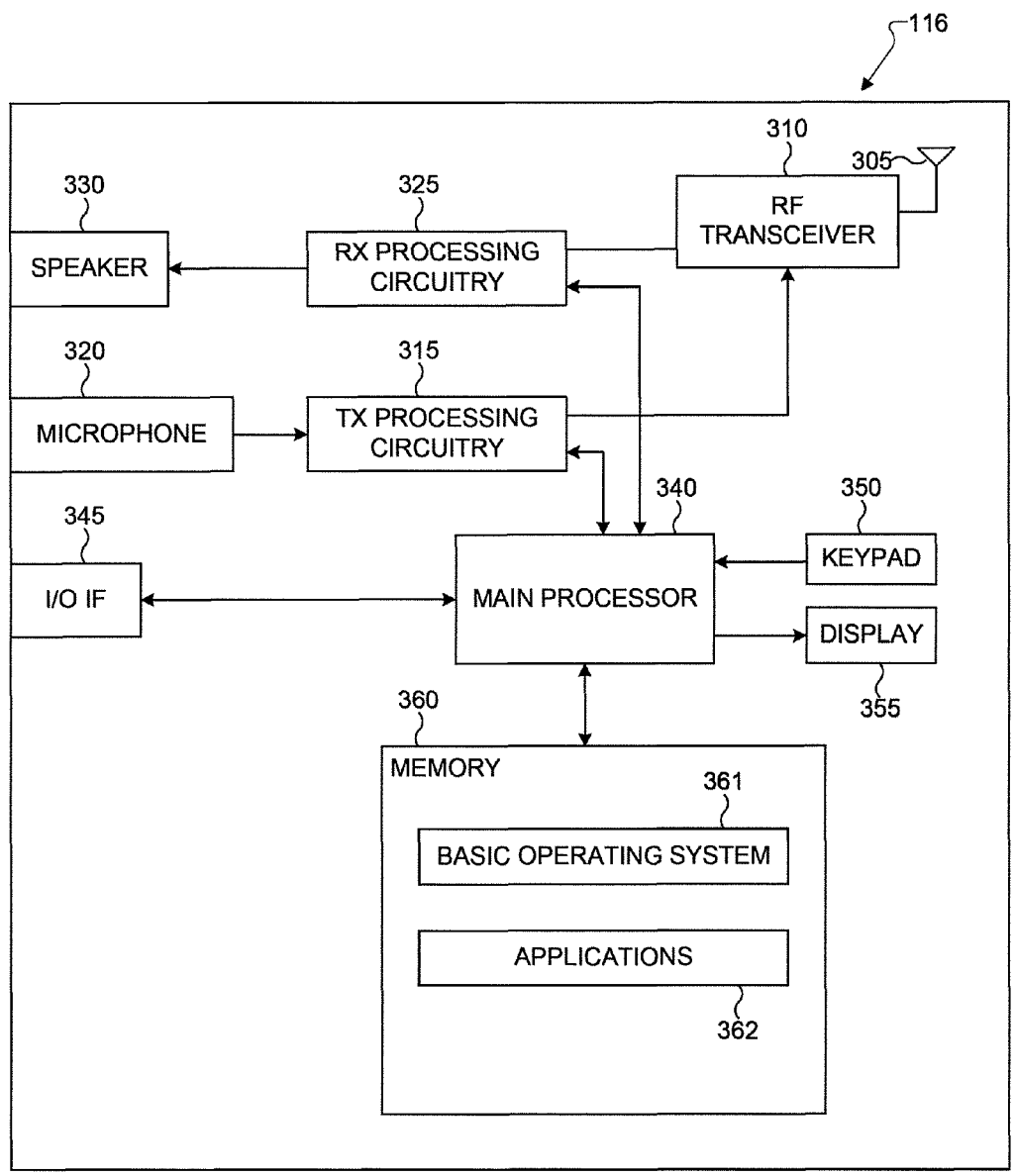
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
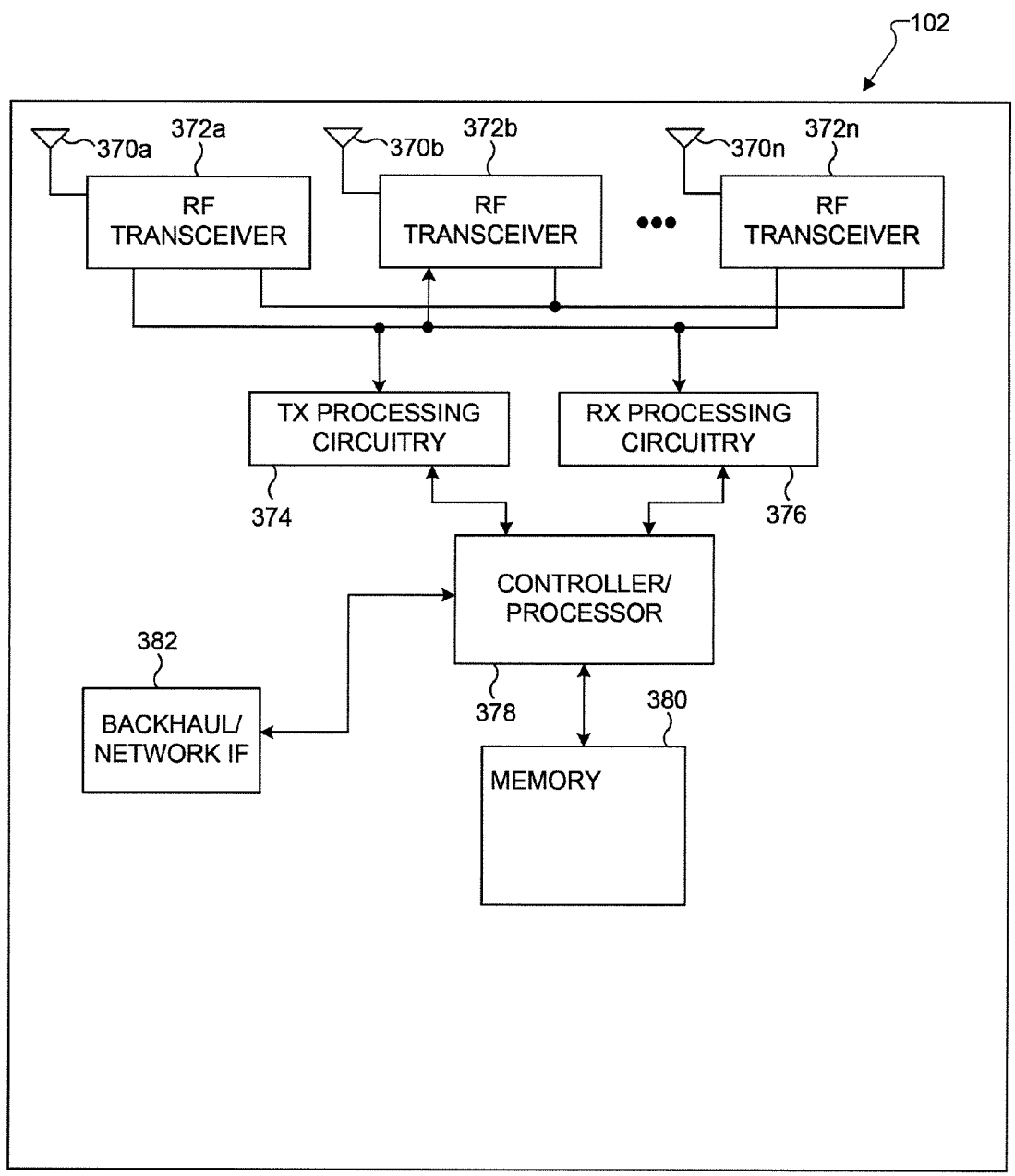
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

The need for high-performance, scalable (with respect to the number and geometry of transmit antennas), and flexible CSI feedback framework and structure for LTE enhancements when FD-MIMO (the use of large two-dimensional antenna arrays) is supported. To achieve high performance, more accurate CSI (in terms of quantized MIMO channel) is needed at the eNB, especially for FDD scenarios. In this case, the precoding framework (PMI-based feedback) of the existing LTE standardization (e.g. Rel.12) may need to be replaced. However, feeding back the quantized channel coefficients may be excessive in terms of feedback requirements. In this disclosure, the following properties of FD-MIMO are factored in for the proposed alternative feedback schemes:

- The use of closely spaced large 2D antenna arrays (primarily geared toward high beamforming gain rather than spatial multiplexing) along with relatively small angular spread for each UE: This allows "compression" or "dimensionality reduction" of the quantized channel feedback based on a fixed set of basis functions/vectors.
- Low mobility as the target scenario for FD-MIMO: Possibility to update channel quantization parameters (such as the channel angular spreads) at a low rate, e.g. using UE-specific higher-layer signaling. In addition, CSI feedback can also be performed cumulatively.

In the present disclosure, a scalable and FDD-enabling CSI feedback scheme for FD-MIMO is described where the downlink channel is quantized according to a finite set of basis functions/vectors to reduce the number of coefficients that need to be quantized and reported from a UE to the eNB. The high-level procedure of the proposed scheme is as follows (assuming the use of 2D antenna array):

- From reception of at least one UL signal (e.g., UL-SRS, UL-DMRS), the eNB 102 measures an associated UL AoA spread associated with each UE, denoted as $[\theta_{min}, \theta_{max}]$ and/or $[\phi_{min}, \phi_{max}]$ in the elevation (zenith) and/or azimuthal dimensions, respectively. These parameters for (or, in general, are parts of) a UL AoA profile associated with the respective UE.
- The acquired AoA values ($\theta_{min}, \theta_{max}, \phi_{min}, \phi_{max}$) or profile are signaled to the UE via a UE-specific medium such as higher-layer RRC signaling or dynamic-BCH (D-BCH). Some other parameters can be signaled as well. These configuration parameters are associated with the choice of channel quantization sub-scheme (corresponding to a reduced subset of basis functions/vectors).
- Upon receiving configuration parameter(s), the UE quantizes the MIMO channel according to the configured sub-scheme and reports (feeds back) the quantized channel to the eNB 102 via an uplink channel.

The three steps listed above are repeated whenever the eNB 102 updates the configuration parameters.

The proposed CSI feedback upgrade requires some significant amount of additional standardization. It is a considerable departure from the Rel.12 LTE CSI feedback paradigm. However, as the size of antenna array increases, such an evolution path is eventually inevitable if high-performance FD-MIMO is a goal of the future evolution of LTE—especially in FDD scenarios.

Advantages of the approach described in the present disclosure include overhead reduction from quantizing coefficients to a significantly smaller number through subspace reduction, compared to direct channel quantization, as described above. It is also possible to derive the basis functions/vectors at the UE using, for example, eigen-vector decomposition (EVD) or singular-value decomposition (SVD) and feed them back to the eNB. However, EVD/SVD precoders are known to be sensitive to error (which results in unintentional signal space cancellation) even when regularization is employed. In this sense, a fixed set of basis functions/vectors tends to be more robust.

Figure 4A:
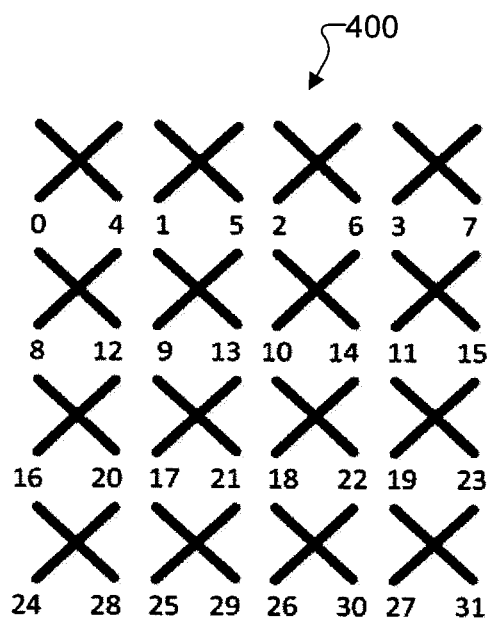
FIGS. 4A and 4B represent exemplary two dimensional (2D) antenna arrays constructed from 16 dual-polarized antenna elements arranged in a 4×4 rectangular format.
Figure 4B:
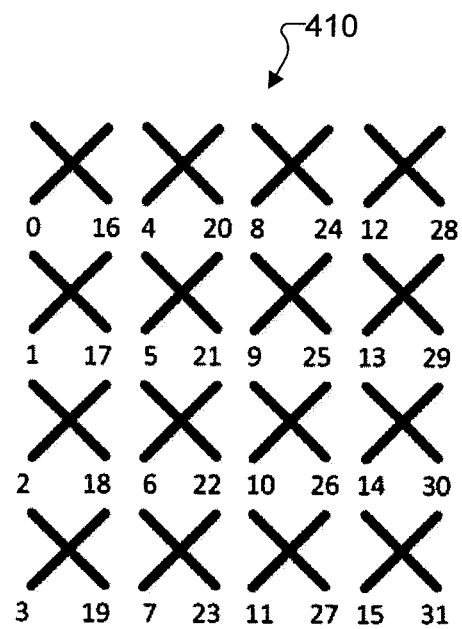

FIGS. 4A and 4B represent two exemplary two dimensional (2D) antenna arrays 400, 410 constructed from 16 dual-polarized antenna elements arranged in a 4×4 rectangular format. In this example, each labelled antenna element is logically mapped or indexed onto a single antenna port. The embodiments shown in FIGS. 4A and 4B are for illustration only. Other embodiments could be used without departing from the scope of the present disclosure.

In general, one antenna port may correspond to multiple antenna elements (physical antennas) combined via a virtualization scheme. The 4×4 dual polarized array represented in FIG. 4A or 4B can then be viewed as 16×2=32-element array of antenna elements. The vertical dimension (consisting of 4 rows) facilitates elevation beamforming, and is in addition to the azimuthal beamforming across the horizontal dimension (consisting of 4 columns of dual polarized antennas). MIMO precoding in Rel.12 LTE standardization (per TS36.211 section 6.3.4.2, 6.3.4.4, and TS36.213 section 7.2.4) was largely designed to offer precoding gain for one-dimensional antenna array. While fixed beamforming (i.e., antenna virtualization) can be implemented across the elevation dimension, it is unable to reap the potential gain offered by the spatial and frequency selective nature of the channel.

In Rel.12 LTE, MIMO precoding (for spatial multiplexing) can be performed either with CRS (cf. TS36.211 section 6.3.4.2) or UE-RS (cf. TS36.211 section 6.3.4.4). In either case, each UE operating in spatial multiplexing mode(s) is configured to report CSI that contains PMI (i.e. precoding codebook index). The PMI report is derived from one of the following sets of standardized codebooks:

Two antenna ports: {TS36.211 table 6.3.4.2.3-1}
Four antenna ports: {TS36.211 table 6.3.4.2.3-2} or {TS36.213 table 7.2.4-0A, B, C, and D}
Eight antenna ports: {TS36.213 table 7.2.4-1, 2, 3, 4, 5, 6, 7, and 8}

If the eNB 102 follows the UE's PMI recommendation, the eNB 102 is expected to precode its transmitted signal according to the recommended precoding vector/matrix (for a given subframe and PRB). Regardless whether the eNB 102 follows the UE's recommendation, the UE 102 is configured to report a PMI according to the above precoding codebooks. Here a PMI (which can consist of a single index or a pair of indices) is associated with a precoding matrix W of size $N_{TX} \times N_L$, where $N_{TX}$ is the total number of antenna ports and $N_L$ is the number of transmission layers. As the number of antenna elements increases (for example, up to 8 rows of four dual-polarized antennas which amounts to 64 elements), significantly larger precoding codebooks are needed. In addition, as MU-MIMO becomes a dominant scheduling strategy, obtaining a good multi-user pairing from single-user PMIs and CQIs (received from the active UEs) has proved to be challenging. Hence, the Rel.12 LTE CSI feedback paradigm limits the potential of FD-MIMO especially in FDD scenarios where channel reciprocity is limited to long-term channel statistics at best.

In addition, CSI-RS resources are expensive and must be managed efficiently. It is therefore desirable to reduce the number of CSI-RS resources per UE in addition to improving CSI-RS coverage.

Therefore, for FD-MIMO which utilizes 2D antenna array (hence 2D precoding), the need for high-performance, scalable with respect to the number and geometry of transmit antennas, and flexible CSI feedback framework and structure (in addition to efficient utilization of CSI-RS resources) is evident. To achieve high performance, more accurate CSI (preferably in terms of quantized MIMO channel) is needed at the eNB 102. This is especially the case for FDD scenarios where short-term DL-UL reciprocity is infeasible. In this case, the previous LTE (e.g. Rel.12) precoding framework (PMI-based feedback) could be replaced. Yet feeding back the quantized channel coefficients could be excessive in terms of feedback requirements as previously mentioned.

In embodiments of this disclosure, the following properties of FD-MIMO are factored in for our proposed schemes:

The use of closely spaced large 2D antenna arrays (primarily geared toward high beamforming gain rather than spatial multiplexing) along with relatively small angular spread for each UE: This allows "compression" or "dimensionality reduction" of the quantized channel feedback. In this case, a set of basis functions/vectors is used and quantization is basically expressing the MIMO channel in terms of a linear combination of those basis functions/vectors.

Low mobility as the target scenario for FD-MIMO: Possibility to update quantization parameters (long-term channel statistics such as channel angular spread) at a low rate, e.g. using UE-specific higher-layer signaling. In addition, CSI feedback can also be performed cumulatively.

The above two properties can also be used to perform precoding on CSI-RS. This facilitates more efficient utilization of CSI-RS resource since the number of CSI-RS ports per UE may be reduced and/or CSI-RS coverage can be improved.

While time-varying basis functions/vectors can be used (for example, derived from EVD or SVD and fed back from the UE to the eNB), small channel angular spread warrants the use of a fixed master-set of basis functions/vectors derived primarily from the channel angular spread characteristics. For a given channel angular spread characteristic, a subset of the fixed master-set (pre-known both at the UE and the eNB) is chosen by the eNB and signaled to the UE.

Figure 5:
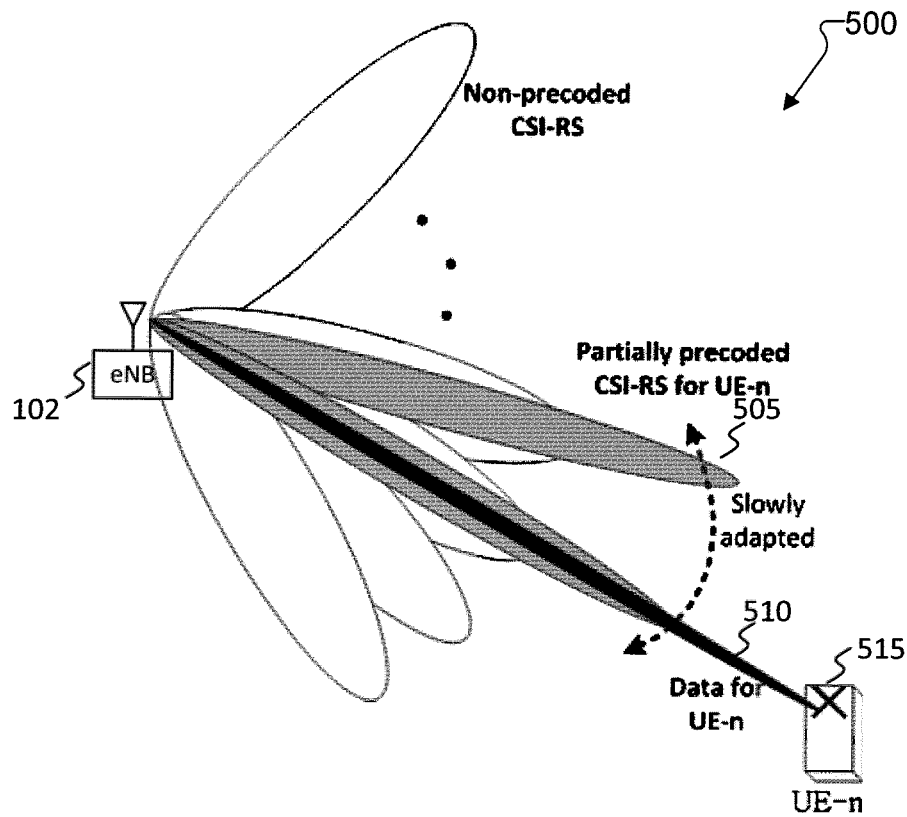
FIG. 5 illustrates a portion of an advanced wireless communication system within which a partial precoded CSI-RS processing may be implemented according to this disclosure.

FIG. 5 illustrates a portion of an advanced wireless communication system within which a partially precoded CSI-RS processing can be implemented in accordance with various embodiments of the present disclosure. The embodiment shown in FIG. 5 is for illustration only. Other embodiments could be used without departing from the scope of the present disclosure.

Referring to FIG. 5, the wireless communication system 500 includes at least one base station (BS) 102 (also sometimes referred to as "NodeB," "evolved NodeB" or "eNB"), and generally a plurality of base stations (not shown). The nth-User equipment UE-n 515 (also sometimes referred to as a "mobile station" or "MS") communicates wirelessly with the base station 102. In the exemplary embodiment, at least one of the base stations 102 includes an antenna array as described in association with FIG. 4. Each of the base stations 102 and the user equipment UE-n includes a processor (or programmable controller or the like) coupled to a wireless transceiver and configured to control transmission and reception of signals via the transceiver, as well as to perform various functions associated with preparing signals for transmission and/or processing received signals, such as demodulation, decoding, and so forth.

In this framework, the overall TX precoder associated with each of the UEs (say, UE-n) can be written as described in the following Equation 1:

$$W = W_L V. \qquad (1)$$

Assuming that the total number of TX antennas (at the eNB) is $N_{TX}$ and the transmission rank (the number of transmission layers) is $N_L$, the size of the precoder matrix W is $N_{TX} \times N_L$. For dual-polarized array like that depicted in FIG. 4 with $N_r$ rows and $N_c$ columns, the number of TX antennas is $N_{TX} = 2 N_r N_c$. This precoder can be either a channel representation (such as channel quantization of $H^{(q,f)}$, that is, the channel associated with the q-th RX antenna and the f-th subband) or a precoder/beamformer representation (such as a vector or matrix corresponding to eigenvector(s)). In the second case, the precoder can be computed either assuming a single-user (SU) or a multi-user (MU) transmission hypothesis. Here, $W_L$ denotes the long-term component which can be associated with the aforementioned AoD profile (which consists of a subset of basis vectors/functions) and V the short-term component which can be associated with a linear transformation of the long-term component (such as a linear combination of the subset of basis functions/vectors).

The beam 505 is associated with at least one CSI-RS port partially precoded with the precoder matrix $W_L$ for UE-n 515. Additionally, the beam 510 carries transmission data precoded with the precoder matrix $W_L V$ for UE-n 515. The beam 505 is slowly adapted while the beam 510 is adapted at a faster rate in comparison to the beam 505.

The corresponding CSI feedback scheme is disclosed in U.S. Provisional patent application Ser. No. 14/593,711, filed on Jan. 9, 2015, with the Title of CHANNEL STATE INFORMATION REPORTING WITH BASIS EXPANSION FOR ADVANCED WIRELESS COMMUNICATIONS SYSTEMS ("REF1"), which is hereby incorporated into the present disclosure as if fully set forth herein. In this patent application, a CSI-RS resource utilization scheme based on the above properties is disclosed in conjunction to the short-term precoding.

Three methods, Method 1, 2 and 3, for the partial precoding of CSI-RS are proposed herein after.

Method 1: When DL AoD profile estimate (angular spread and mean/median, or AoD distribution) is available at the eNB, CSI-RS ports are precoded according to the estimated DL AoD profile. Instead of DL AoD profile estimate, at least one long-term DL channel statistics can be used. The resulting precoded CSI-RS resource occupies a smaller number of ports. This is especially relevant when UL-DL long-term reciprocity holds such as when the UL-DL duplex distance is not too large. In this case, an estimate of long-term DL channel characteristics can be obtained from measuring at least one UL signal.

Method 2: When DL AoD profile estimate or an estimate of DL long-term channel properties is unavailable, CSI-RS ports are precoded according to a predetermined subset for a given subframe. The resulting precoded CSI-RS resource also occupies a smaller number of ports. This is especially relevant when UL-DL long-term reciprocity does not hold such as when the UL-DL duplex distance is too large.

Method 3: This method is a variant of Method 1, which trades off the potential coverage gain of UE-specific CSI-RS precoding and utilization of CSI-RS resources. In this method, a group of UEs share a same CSI-RS resource or a same set of CSI-RS resources.

Method 1: The procedure for operating the above Method 1 can include the four main operations, Operations 1-1 to 1-4 as follows.

In Operation 1-1, an eNB acquires an estimate of the DL AoD profile or an estimate of long-term DL channel characteristics. To do this, two exemplary approaches exist: the first option is that from the UL signal reception (for example, UL-SRS, UL-DMRS), the eNB 102 measures an estimate of the UL AoA spread or an estimate of long-term DL channel characteristics associated with each UE. In case of AoA spread, this is denoted as $[\theta_{min}, \theta_{max}]$ and $[\phi_{min}, \phi_{max}]$ in the elevation (zenith) and azimuthal dimensions, respectively. So the eNB performs AoA estimation/measurement by scanning through the entire range of AoA values. This yields a rough AoA profile, which allows the eNB 102 to estimate the range of AoAs. By reciprocity of long-term channel statistics, the range of UL AoAs represents the range of DL AoDs for a particular UE since UL/DL multi-path profiles (long term statistics) are closely correlated. Therefore, eNB 102 can estimate DL multi-path profile from UL.

This UL measurement can be done with the same antenna (2D) antenna array as that used for DL transmissions, or a subset of the available antenna elements.

The second option for Operation 1-1 is that instead of the eNB 102, it is possible for the UE 116 to measure the range of DL AoAs or an estimate of long-term DL channel characteristics and reports it to the eNB 102 via an UL feedback channel. Since spatial channel profile varies slowly, low-rate feedback is sufficient. While the above discussion assumes the use of a single angular cone of AoDs defined by $\{(\phi, \theta): \phi \in [\phi_{min}, \phi_{max}] \wedge \theta \in [\theta_{min}, \theta_{max}]\}$, it is also possible for the eNB 102 to configure the UE 116 for a plurality of cones whenever appropriate.

In Operation 1-2, upon acquiring an estimate of the DL AoD profile (or in general, DL channel long-term statistics) for each UE (say, UE-n), the eNB 102 determines a UE-specific precoding to be applied to the CSI-RS resource assigned to UE-n. In relation to Equation 1, this UE-specific precoder corresponds to $W_L$. This UE-specific assignment includes both a UE-specific precoder $W_L$ and a set of CSI-RS ports chosen by the eNB 102 for a UE-n. The number of CSI-RS ports assigned to UE-n depends on the chosen reduced subset of basis functions/vectors associated with the small angular spreads in the AoD profile $\{(\phi, \theta): \phi \in [\phi_{min}, \phi_{max}] \theta \theta \in [\theta_{min}, \theta_{max}]\}$ (or in general, DL channel long-term statistics). For example, larger angular spread is associated with higher number of assigned CSI-RS ports.

While the chosen subset for UE-n is UE-specific, the master-set of all possible basis vectors is made common for all the UEs.

Assignments for different UEs can overlap in terms of UE-specific set of CSI-RS ports, UE-specific precoder $W_L$, or both. An overlap can be partial or complete.

Alt 1-2-1: For a same time (subframe pattern) and frequency allocation (associated with the CSI-RS resource), different UEs can be allocated non-overlapping subset of basis vectors/functions. Therefore, CSI-RS resource multiplexing is performed in spatial domain across different basis vectors.

Alt 1-2-2: Likewise, for a same or overlapping subset of basis vectors/functions, different time (subframe pattern) and/or frequency allocation can be chosen for different UEs. Hence, CSI-RS resource multiplexing is performed in time and frequency domain.

Alt 1-2-3: Yet another possibility is to perform spatial multiplexing of CSI-RS resources within the same time and frequency allocation as well as the same subset of basis vectors/functions. While this is the most efficient utilization scheme, it incurs more interference among the multiplexed CSI-RS resources.

To ensure reasonable performance, this scheme requires multiple RX antennas (≥the number of multiplexed resources) at each UE.

For Alt 1-2-3, to be able to assist channel measurement via CSI-RS (although not required), the eNB 102 sends some information to each of the UE-n pertaining the subset selection. Examples of such information include the number of basis vectors/functions in the selected subset, the number of ports of partially precoded CSI-RS, and/or a partial or full indicator on the selected subset. This can be done via higher layer signaling (such as RRC in LTE) or included in the downlink control information (DCI) of an UL grant (this DL signaling of subset selection is detailed in REF 1) and/or a DL assignment.

In Operation 1-3, upon receiving its CSI-RS along with the associated configuration information, UE-n performs channel measurement where the channel to be measured includes the long-term (for example, wideband) precoder, that is, $H^{(q,f)}W_L$. Therefore, the long-term precoding operating associated with $W_L$ at the eNB 102 is transparent to UE-n as it is combined with the measured channel. This operation is to be done for each of the UEs that is assigned a CSI-RS resource. Likewise, the UEs are not required to know the master-set of basis functions/vectors associated with or used by the eNB 102.

In Operation 1-4, once channel measurement in Operation 1-3 is performed, UE-n chooses a short-term (for example, frequency selective) precoder in response to the measured channel. In relation to Equation 1, this precoder is V, which is essentially a linear transformation (e.g. linear combination) of the selected subset of basis vectors/functions (represented by $W_L$), which is transparent to UE-n. The precoder V can correspond to DL MIMO channel quantization coefficients or quantization of at least one eigenvector of the measured channel or a matrix/vector taken from a precoding codebook. The details for this operation are described in REF 1, and U.S. Provisional Patent Application No. 62/073,782, filed on Oct. 31, 2014 with the Title of CODEBOOK DESIGN AND FEEDBACK PROCEDURES FOR MIMO WIRELESS COMMUNICATION SYSTEMS ("REF 2"), which is also hereby incorporated into the present disclosure as if fully set forth herein.

The eNB signals the value of $N_B$ (the number of CSI-RS ports) to UE via semi-static or dynamic way.

The precoder V is chosen from a predetermined codebook, which is known by all the UEs and the eNB 102, to optimize the throughput through the channel, according to the number of CSI-RS ports. Therefore, the codebook is standardized and designed for different number of precoded CSI-RS ports. Given a codebook for a certain number of precoded CSI-RS ports={$v^{(0)}$, $v^{(1)}$, ..., $v^{(n-1)}$} the UE 102 selects a preferred or recommended precoder based on a performance metric. For instance, the UE selects the optimized precoder $v^{(PMI)}$ that maximizes the outcome of M, where M is a performance metric which is a function of a channel state H and a precoder v: $M\{H \times v^{(0)}\}$, $M\{H \times v^{(1)}\}$, ... $M\{H \times v^{(n-1)}\} \rightarrow$ The chosen precoder V can be reported to the eNB 102 via an UL channel such as PUCCH or PUSCH. With PUCCH, a new periodic reporting mechanism needs to be configured (here, multiple PUCCH resources may be needed). With PUSCH, the aperiodic PUSCH-based reporting can be utilized where the eNB 102 triggers the UE to report quantized DL channel coefficients.

In case of DL channel quantization for 2D antenna array (in case of FD-MIMO), the quantization of the channel matrix $H^{(q,f)}$ associated with each polarization (+45 or −45), the q-th receive antenna (at the UE), and f-th subband amounts to computing the expansion coefficients $\{c_{k,l}^{(q,f)}\}_{k,l}$ relative to the basis set $\{A(\phi_k, \theta_l)\}_{k,l}$ in Equation 2A or 2B. Here $H^{(q,f)}$ is a $N_r \times N_c$ matrix where $N_r$ and $N_c$ are the number of rows (corresponding to the azimuthal angle θ) and columns (corresponding to the elevation angle φ) in the 2D array, respectively. The numbering of antenna ports follows that in FIG. 4A or 4B.

In some embodiments, the subset of angles $\{\phi_k, \phi_l\}_{k,l}$ are chosen to cover the range of AoDs $[\theta_{min}, \theta_{max}]$ and $[\phi_{min}, \phi_{max}]$. The $N_r \times N_c$ matrix is the transmit antenna array response $A(\phi_k, \phi_l)$ for a given pair of AoDs. In case of multiple-cone configuration, Equation 2A is applied to each of the plurality of cones:

$$H^{(q,f)} \approx \sum_{k=k_0}^{k_0+K-1} \sum_{l=l_0}^{l_0+L-1} c_{k,l}^{(q,f)} A(\phi_k, \theta_l) \qquad (2A)$$

In some embodiments, a subset of pair of angles $\Omega = \{(\phi_k, \theta_l)\}$ are chosen to represent a plurality of cones, wherein the elements of the subset are one-to-one mapped to the plurality of cones (represented by Ω). The $N_r \times N_c$ matrix is the transmit antenna array response $A(\phi_k, \theta_l)$ for the subset as the following Equation 2B:

$$H^{(q,f)} \approx \sum_{(k,l) \in \Omega} c_{k,l}^{(q,f)} A(\phi_k, \theta_l) \qquad (2B)$$

Method 2: The procedure for Method 2 is similar to Method 1 except that Operation 1-1 of Method 1 is not performed. Instead, a fixed predetermined subset selection is chosen for each of the UEs (say, UE-n) as Operation 2-1. This subset selection can be realized as a pattern which varies across time (subframe) and/or frequency (RE). For example, the subset selection can represent a fixed predetermined sequence of hopping pattern in time and/or frequency where different subsets of basis functions/vectors are chosen for different time, frequency, or time-frequency locations. Alternatively, the pattern can simply be a fixed subset which does not vary across time or frequency locations.

Given the pattern in Operation 2-1, Operation 2-2 responds by selecting the associated $W_L$. Otherwise, the operation (including CSI-RS resource allocation) is similar to Operation 1-2 of Method 1.

Operations 2-3 and 2-4 of Method 2 are the same as Operations 1-3 and 1-4 of Method 1.

Method 3: while Method 1 maximizes CSI-RS beamforming gain per UE (and hence CSI-RS coverage gain), it may not be suitable when the number of UEs connected to the eNB is large. When CSI-RS resources are limited and the number of UEs is large, it is desirable to trade off UE-specific CSI-RS beamforming gain with CSI-RS resource utilization. This trade-off is exemplified in Method 3, which implies group-based CSI-RS precoding. To conserve CSI-RS resources, UEs are partitioned into multiple groups where each group is assigned one CSI-RS resource or, in general, a common set of CSI-RS resources. The procedure for Method 3 is similar to Method 1 except for Operation 1-2:

Operations 3-1, 3-3 and 3-4 of Method 3 are similar to Operations 1-1, 1-3, and 1-4 of Method 1, respectively.

Operation 3-2 of Method 3: Upon acquiring an estimate of the DL AoD profile (or in general, DL channel long-term statistics) for all the UEs, the eNB 102 partitions all those UEs into multiple groups where each group (say, group-n) is assigned one CSI-RS resource or a common set of CSI-RS resources. In relation to equation 1, this group-specific precoder corresponds to $W_L$. This group-specific assignment includes both group-specific precoder $W_L$ and a set of CSI-RS ports chosen by the eNB 102 for group-n. The number of CSI-RS ports assigned to group-n depends on the chosen reduced subset of basis functions/vectors. This is jointly chosen for all the UEs within group-n. It may be associated with the angular spreads in the AoD profiles $\{(\phi, \theta): \phi \in [\phi_{min}, \phi_{max}] \Lambda \theta \in [\theta_{min}, \theta_{max}]\}$ associated with all the UEs in group-n (or in general, DL channel long-term statistics). For example, larger angular spread is associated with higher number of assigned CSI-RS ports.

While the chosen subset for group-n is group-specific, the master-set of all possible basis vectors is made common for all the UE groups.

Assignments for different groups may overlap in terms of UE-specific set of CSI-RS ports, UE-specific precoder $W_L$, or both. An overlap can be partial or complete.

(Alt 3-2-1) For a same time (subframe pattern) and frequency allocation (associated with the CSI-RS resource), different groups can be allocated non-overlapping subsets of basis vectors/functions. Therefore, CSI-RS resource multiplexing is performed in spatial domain across different basis vectors.

(Alt 3-2-2) Likewise, for a same or overlapping subset of basis vectors/functions, different time (subframe pattern) and/or frequency allocation can be chosen for different groups. Hence, CSI-RS resource multiplexing is performed in time and frequency domain.

(Alt 3-2-3) Yet another possibility is to perforin spatial multiplexing of CSI-RS resources within the same time and frequency allocation as well as the same subset of basis vectors/functions. While this is the most efficient utilization scheme, it incurs more interference among the multiplexed CSI-RS resources.

To ensure reasonable performance, this scheme requires multiple RX antennas (≥the number of multiplexed resources) at each group.

For Alt 3-2-3, to be able to assist channel measurement via CSI-RS (although not required), the eNB 102 sends some information to each of the groups pertaining the subset selection. Examples of such information include the number of basis vectors/functions in the selected subset, the number of ports of partially precoded CSI-RS, and/or a partial or full indicator on the selected subset. This can be done via higher layer signaling (such as RRC in LTE) or included in the downlink control information (DCI) of an UL grant (this DL signaling or subset selection is detailed in REF 1) or a DL assignment.

Grouping of UEs can be done in various manners.

One embodiment is to group the UEs based on their estimated DL AoD profiles or long-term DL channel statistics. UEs whose DL AoD profiles or long-term channel statistics are similar are grouped together into one group. This group of UEs is then assigned a common set of CSI-RS resources.

If estimated DL AoD profiles are used, an exemplary two-step procedure is as follows: Step (i): Partition all UEs into multiple groups where each group consists of UEs having similar DL AoD profiles; Step (ii): For a given group G(n), a common AoD profile is derived for selecting a subset of CSI-RS resources. This common profile could be a union-set of the associated AoD profiles (e.g. $U_{i \in G(n)}[\phi_{min}(i), \phi_{max}(i)]\Lambda \theta \in [\theta_{min}(i), \theta_{max}(i)]$) or an intersection-set of the associated AoD profiles ($\cap_{i \in G(n)}[\phi_{min}(i), \phi_{max}(i)]\Lambda \theta \in [\theta_{min}(i), \theta_{max}(i)]$).

If long-term DL channel statistics such as channel covariance matrix is used, the matrix can be represented in terms of linear combinations of DFT-matrices. Based on the strength (magnitude) of the expansion coefficients, a common basis vector profile is derived for selecting a subset of CSI-RS resources analogous to step (ii) of the previous alternative. Either union or intersection of the utilized basis vectors (from the master-set) can be used to derive this common profile.

Figure 6:
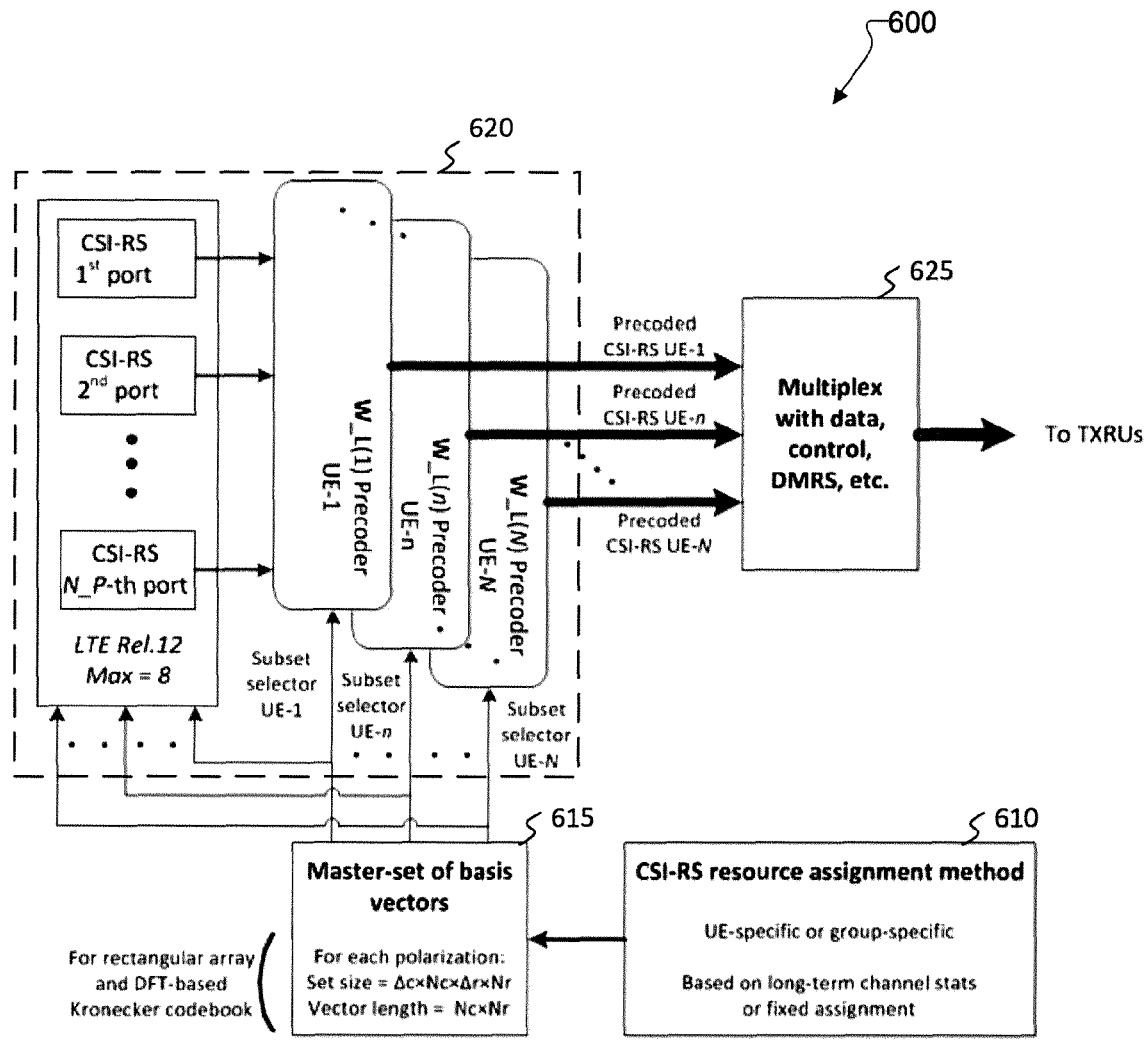
FIG. 6 is a diagram illustrating the partial precoding process for CSI-RS associated with Methods 1, 2, and 3 of this disclosure.
Figure 7:
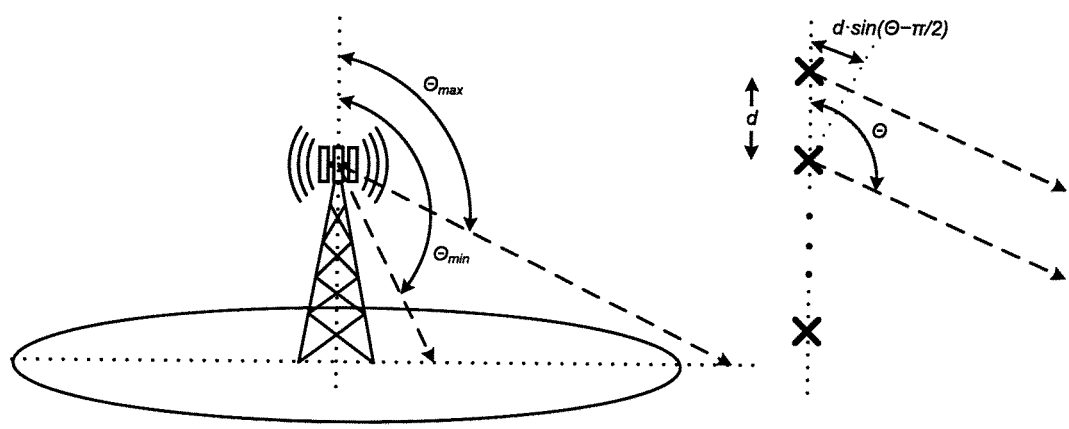
FIG. 7 illustrates the subset of elevation dimensions for channel state information reporting with basis expansion in accordance with various embodiments of the present disclosure, where a similar visualization applied to azimuthal dimensions.
Figure 8:
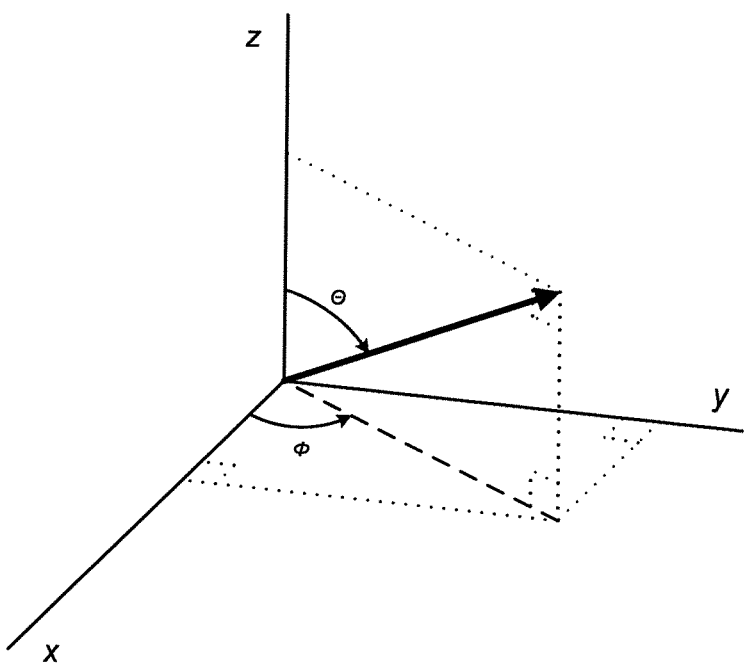
FIG. 8 illustrates a coordinate system for use in connection with channel state information reporting with basis expansion in according to this disclosure.

For all the three methods, it is possible to use a same set of CSI-RS ports for different UEs or different groups, but different UE-specific or group-specific precoder $W_L$. On top of time and frequency locations (offsets), this increases the number of distinct CSI-RS resource assignments that can be allocated across UEs and groups. FIG. 6 is a diagram illustrating the partial precoding operations for CSI-RS associated with Methods 1, 2, and 3 above. The embodiment shown in FIG. 6 is for illustration only. Other embodiments could be used without departing from the scope of the present disclosure.

Here, a common master-set is shared by all the UEs at a given eNB. CSI-RS resource assignment block 610 represents Operations 1-1, 2-1 and 3-1 of Method 1, 2, and 3, respectively. In this operation block, CSI-RS resource is assigned on a basis of UE-specific or group-specific manner.

Then Master-set of basis vectors block 615 represents Operations 1-2, 2-2 and 3-2 of Method 1, 2, and 3, respectively. In this operation block, depending on the basis selection criteria (Method 1, 2, or 3), a subset of basis functions/vectors is selected for each of the UEs to form a precoder for CSI-RS.

Precoding operation block 620 represents Operations 1-3, 2-3, and 3-3 of Method 1, 2, and 3, respectively. In this operation block, the assigned CSI-RS resources to respective UEs are precoded with the selected subset of basis functions/vectors.

Multiplexing operation block 625 represents Operations 1-4, 2-4 and 3-4 of Method 1, 2, and 3, respectively. Once precoded, all the precoded CSI-RS resources are multiplexed with data, control signaling, DMRS, and other downlink signals. The resulting multiplexed signal is sent to all the TXRUs for transmission.

Choice of Basis Functions/Vectors and its Associated Signaling

Embodiment 1

For a 2D dual-polarized array with a sufficiently small inter-element spacing, for each polarization (+45 or −45) $A(\phi, \theta)$ can be written as follows (see FIG. 7 and FIG. 8):

$$A(\phi, \theta) = \frac{1}{\sqrt{N_r N_c}} \begin{bmatrix} 1 \\ \exp\left(j\frac{2\pi d_r \sin(\theta - \pi/2)}{\lambda}\right) \\ \vdots \\ \exp\left(j(N_r - 1)\frac{2\pi d_r \sin(\theta - \pi/2)}{\lambda}\right) \end{bmatrix} \quad (3)$$

$$\begin{bmatrix} 1 \\ \exp\left(j\frac{2\pi d_c \cos(\phi)}{\lambda}\right) \\ \vdots \\ \exp\left(j(N_c - 1)\frac{2\pi d_c \cos(\phi)}{\lambda}\right) \end{bmatrix}^T \triangleq a_r(\theta) a_c^T(\phi)$$

In this case, the number of channel coefficients $c_{k,l}^{(q,f)}$ that need to be quantized is $2KL \times N_{RX} N_F$ instead of $2N_r N_c \times N_{RX} N_F$. When $(\theta_{max} - \theta_{min})$ and $(\phi_{max} - \phi_{min})$ are relatively small, it is expected that $KL \ll N_r N_c$ (which results in some saving in feedback requirements). This is because for a reasonable time span, a low-mobility UE is localized within a small angular cone of AoDs defined by $\{(\phi, \theta): \phi \in [\phi_{min}, \phi_{max}] \wedge \theta \in [\theta_{min}, \theta_{max}]\}$.

The proposed scheme operates based on a predetermined master-set of basis functions/vectors. This master-set is fixed and constructed to cover the entire range of AoD values, that is, $\{(\phi, \theta): \phi \in [0, 2\pi) \wedge \theta \in [0, \pi)\}$. For a given number of rows and columns $(N_r, N_c)$, at least $N_r$ values of $\theta$ (preferably well-spaced spanning $[0, \pi)$) and $N_c$ values of $\phi$ (also preferably well-spaced spanning $[0, 2\pi)$) are needed to construct a complete basis set (in multidimensional complex-valued field/space). One possible complete (and tight) master-set can be constructed from uniformly spaced AoD values corresponding to Equation 2A and/or Equation 3:

$$\theta_l = \frac{\pi}{N_r} l, \quad (4)$$

$$\phi_k = \frac{2\pi}{N_c} k,$$

$$l = 0, 1, \ldots, N_r - 1,$$

$$k = 0, 1, \ldots, N_c - 1$$

In Equation 4, the number of basis functions in the master-set is $N_r N_c$. However, for various reasons it is better to have an over-complete master-set in practice, which can be constructed by oversampling the AoD dimensions. This results in a larger size of master-set. For example, with oversampling factors of $\Omega_r$ and $\Omega_c$ (integers >1), the following AoD oversampling scheme can be used to construct a master-set of size $\Omega_r \Omega_c N_r N_c$:

$$\theta_l = \frac{\pi}{\Omega_r N_r} l, \quad (5)$$

$$\phi_k = \frac{2\pi}{\Omega_c N_c} k,$$

$$l = 0, 1, \ldots, \Omega_r N_r - 1,$$

$$k = 0, 1, \ldots, \Omega_c N_c - 1$$

Embodiment 2

Notice that Equation 2A and 3 facilitate (or at least encourage) a linear discretization in the AoD domain. Alternatively, it is also possible to represent the MIMO channel as a linear combinations of basis functions/vectors in the DFT phase domain, which is:

$$H^{(q,f)} \cong \sum_{k=k_0}^{k_0+K-1} \sum_{l=l_0}^{l_0+L-1} c_{k,l}^{(q,f)} B_{k,l} \quad (6)$$

$$B_{k,l} = \frac{1}{\sqrt{N_r N_c}} \begin{bmatrix} 1 \\ \exp\left(j\frac{2\pi l}{\Delta_r N_r}\right) \\ \vdots \\ \exp\left(j(N_r - 1)\frac{2\pi l}{\Delta_r N_r}\right) \end{bmatrix} \begin{bmatrix} 1 \\ \exp\left(j\frac{2\pi k}{\Delta_c N_c}\right) \\ \vdots \\ \exp\left(j(N_c - 1)\frac{2\pi k}{\Delta_c N_c}\right) \end{bmatrix}^T \quad (7)$$

Analogous to the first embodiment, in case of multiple-cone configuration, Equations 6 and 7 applied to each of the plurality of cones.

Similar to Equation 5, $\Delta_r$ and $\Delta_c$ in Equation 7 are oversampling factors (integers $\geq 1$, with 1 as a special case of non-overlapping DFT beams), which produce overlapping DFT beams. In that case, the master-set associated with Equation 6 and 7 is given as the following Equation 8A:

$$B_{k,l} = \frac{1}{\sqrt{N_r N_c}} \begin{bmatrix} 1 \\ \exp\left(j\frac{2\pi l}{\Delta_r N_r}\right) \\ \vdots \\ \exp\left(j(N_r - 1)\frac{2\pi l}{\Delta_r N_r}\right) \end{bmatrix} \begin{bmatrix} 1 \\ \exp\left(j\frac{2\pi k}{\Delta_c N_c}\right) \\ \vdots \\ \exp\left(j(N_c - 1)\frac{2\pi k}{\Delta_c N_c}\right) \end{bmatrix}^T, \quad (8A)$$

$$l = 0, 1, \ldots, \Delta_r N_r - 1,$$

$$k = 0, 1, \ldots, \Delta_c N_c - 1$$

As mentioned above, oversampling factors of 1 correspond to non-overlapping beams, i.e. critically-sampled DFT vectors. Similarly, the number of channel coefficients $c_{k,l}^{(q,f)}$ that need to be quantized is $2KL \times N_{RX} N_F$ instead of $2N_r N_c \times N_{RX} N_F$. When $(\theta_{max} - \theta_{min})$ and $(\phi_{max} - \phi_{min})$ are relatively small, it is expected that $KL \ll N_r N_c$ (which results in some saving in feedback requirements).

In both Embodiments 1 and 2, the values $\{k_0, K, l_0, L\}$ are chosen for each UE such that the small angular cone of AoDs defined by $\{(\phi, \theta): \phi \in [\phi_{min}, \phi_{max}] \wedge \theta \in [\theta_{min}, \theta_{max}]\}$ is covered.

Embodiment 3

Starting from either Embodiment 1 or 2, another level of reduction in dimensionality can be achieved if the channel representations in Equation 2/2B or 6 is applied to the channel eigenvectors rather than the channel itself. Using Equation 2b to illustrate the method (which should be readily extended to the case with Equation 2 or 6 by those skilled in the art), the procedure is as follows:

Eigen-decomposition or singular-value decomposition is performed to the DL MIMO channel for each polarization and frequency sub-band. Here the channels associated with different receive antennas are concatenated into one channel matrix.

Based on the chosen RI (for example, either N=1 or 2), the UE 116 selects N dominant (strongest) eigenvectors (or the right singular vectors) and the corresponding eigenvalues are reflected/captured in the N CQI values that are reported along with the RI.

Since the UE is situated within one or a few small angular cones, each of the N eigenvectors (for each polarization and frequency sub-band) allows the following approximation (cf. Equation 2B)).

$$v^{(f)} \cong \tau_{(k,l) \in \Omega} d_{k,l}^{(f)} \text{vec}\{A(\phi_k, \theta_l)\} \tag{8B}$$

Here vec{X} converts the matrix X into a vector by stacking all the column vectors of X.

For each of the N eigenvectors, the coefficients $d_{k,l}^{(f)}$ are then quantized by the UE 116 and reported to the eNB 102.

Once eNB 102 receives the report from the UE 116, eNB 102 reconstructs each of the N eigenvectors according to Equation 8B.

In general, this embodiment captures the UE 116 feedback and eNB 102 reconstruction of N quantized precoding vectors for N transmission layers, where each of the N precoding vectors (with a special case of N=1 or 2) is quantized according to the channel representation in Equation 2A/2B or 6 as embodied in Equation 8B. The associated CQI value(s) correspond to the value of RI and the choice of the N precoding vectors. The above embodiment where the precoding vectors are eigenvectors is exemplary.

For all the aforementioned Embodiments 1, 2, and 3, a quantization scheme is needed. Given the above channel representation parameters, the coefficients $\{c_{k,l}^{(q,f)}\}$ are to be computed by the UE (see Section C for details). Then those coefficients are quantized at the UE 116 based on a predetermined method/procedure (which needs to be specified). Different quantization procedures (either scalar or vector quantization) can be used to efficiently "compress" the coefficient feedback to the eNB 102.

The quantization of coefficients $\{c_{k,l}^{(q,f)}\}$ requires a quantization codebook C, which can be constructed to minimize a metric such as mean square error or to minimize codebook search time or to exploit the dependencies between samples to be quantized or to meet any other design criterion. Below we provide a few exemplary codebook design considerations and alternatives. Those skilled in the art will recognize that any other codebook alternatives are also within the scope of this invention.

Since the coefficients $\{c_{k,l}^{(q,f)}\}$ are complex, first separate the real and imaginary parts are separated, and then scalar quantized using the same or two different scalar codebooks. The scalar codebooks can be uniform or non-uniform.

Alternatively, first the real and imaginary parts of coefficients are separated, then are vectorized in vectors of fixed length N, and finally vector quantized using vector codebooks. The vector codebooks can be uniform or non-uniform in N-dimensional region in Euclidean space.

In one design, the vector codebooks are different for real and imaginary components.

In another design, the same vector codebook is used for both real and imaginary components.

In one vectorization method, the vectors consist of either all real or all imaginary components of coefficients.

In another vectorization method, the vectors consist of both real and imaginary components of coefficients. For example, the real and imaginary components of the same coefficient are placed next to each other either in the same vector or in two adjacent vectors (real component is the last element of the vector and imaginary component is the first element of the adjacent vector).

In another vectorization method, the real and imaginary components are placed according to a predefined permutation.

Alternatively, the amplitudes and phases of the coefficients are quantized using amplitude and phase codebooks, respectively.

The amplitude codebook can be a scalar codebook where the amplitude of each coefficient is quantized separately. The amplitude codebook can be uniform or non-uniform in $(\alpha_l, \alpha_h)$ where $0 \le \alpha_l < \alpha_h$ are positive numbers.

Alternatively, it may be a vector codebook where amplitudes (of fixed length N) of all coefficients are first vectorized and then quantized using a vector amplitude codebook, which can be uniform or non-uniform in N-dimensional region in positive orthant.

The phase codebook can be uniform or nonuniform in $(\alpha_l, \alpha_h)$ where $0 \le \alpha_l \le \alpha_h \le 2\pi$.

In above-mentioned or other codebook designs, the vectorization and quantization at the UE 116 and the reconstruction and de-vectorization (extracting real and imaginary components) at the eNB 102 must be aligned.

Since different vectorization and quantization methods will result in different codebooks, the vectorization and quantization methods can be configurable by eNB 102 and the configuration can be signaled to the UE 116 together with the channel representation parameter signaling (see above). Depending upon the configured vectorization and quantization methods, the UE 116 vectorizes the coefficients and uses the corresponding codebook to quantize the vectors.

The designed codebook may be basis-agnostic or basis-aware. If it is basis-agnostic, then it is desired to design one codebook that is universally applicable to all UEs regardless of their configured basis ($A(\phi_k, \theta_l)$ or $B_{k,l}$). If it is basis-aware, then codebook design can be specific to the basis and can change from basis to basis.

In some designs, the codebook can be fixed and non-adaptive over time, and it can be designed once based on some channel statistics such as second moments. In other designs, it may be adaptive over time, and hence updated periodically or aperiodically based on real channel measurements. This codebook adaptation can be configurable by the eNB together with the channel representation parameter signaling (see above) or separately.

In some designs, the codebook can be non-adaptive (pre-determined) but only a subset of the codebook is used for a given DL channel coefficient quantization. In this case, different subsets of the codebook are used by the UE 116 of interest across consecutive quantizations (and reporting instances). Upon receiving the feedback, the eNB 102 can take into account reports over multiple instances to derive a higher resolution representation of the corresponding DL MIMO channel. For example, a linear filtering may be performed at the eNB across multiple reporting instances. Since different subsets are used across multiple reporting instances, feedback overhead can be reduced for a given desirable resolution. It also allows the eNB 102 to reconstruct and update the DL MIMO channel coefficients at the highest possible reporting rate.

The channel coefficient computation and quantization can be performed separately in which channel coefficients are computed first, for example according to Equation 9 below, and then they ($\hat{c}^{(q,f)}$) are quantized. Alternatively, the quantized channel coefficients are directly obtained, for example using the codebook in place $c_{k,l}^{(q,f)}$ in Equation 8.

If the UE's channel resides in multiple cones, i.e. a set of AoD parameters $\{(\theta_{min}, \theta_{max}\phi_{min}, \phi_{max})\}$, then the channel coefficient quantization and feedback can be joint or it may be cone-specific.

UE and eNB Procedures

Once the eNB receives and decodes the short-term precoder feedback V from UE-k (with $\{c_{k,l}^{(q,f)}\}$ as a special case for channel quantization), the eNB 102 can reconstruct either the DL MIMO channel or the precoder W. Then the eNB 102 can perform link adaptation (including precoding) and scheduling (including MU-MIMO) based on the reconstructed DL MIMO channel from each UE.

Other Variations

Concurrent Operation with Rel.12 CSI Reporting

The following discussion applies when Equation 1 corresponds to DL MIMO channel quantization or eigenvector quantization (i.e. explicit feedback).

While the proposed explicit channel feedback facilitates full link adaptation and scheduling at the eNB 102, it may be beneficial to operate it in conjunction with Rel.12 CSI reporting. Some reasons are as follows:

Concurrent operation with Rel.12 CSI may simplify testing (performance requirements or inter-operability).

Rel.12 CSI may be used to at least convey DL interference information and/or any relevant scaling factor.

In this case, the eNB 102 configures the UE 116 of interest with two reporting schemes: 1) DL channel feedback as described above, 2) Rel.12 CSI feedback schemes (e.g. one periodic PUCCH-based and one aperiodic PUSCH-based). The following exemplary embodiments are possible.

With periodic PUCCH-based reporting. In conjunction with explicit DL channel feedback, a periodic CSI reporting is configured. Two possibilities exist:

Without PMI (mode 1-0 or 2-0): Here RI signals a recommended transmission rank to the eNB (assuming a single-user transmission). CQI can indicate a recommended spectral efficiency (MCS) assuming a given precoding at the eNB with a single-user transmission). This given precoding can either be a fixed precoding vector/matrix or a maximum ratio transmission (MRT) precoding vector/matrix.

Once the eNB receives this report along with the quantized DL channel, the eNB may infer the interference level experienced by the UE (whether it is wideband for 1-0 or narrowband for 2-0).

It is also possible for the eNB to restrict RI to either 1 or 2—either based on other configuration parameter(s) or the codebook subset restriction feature.

With PMI (mode 1-1 or 2-1): When PMI is included, a reference to the existing Rel.12 precoding codebooks (2-, 4-, or 8-antenna port codebooks) is used. Essentially, PMI is an index to a precoding matrix within a codebook. When the number of antenna ports associated with FD-MIMO is larger than 8 (which is most likely the case), the reported PMI may be utilized to signal a recommended precoding matrix/vector associated with the horizontal antenna array dimension (which does not exceed e.g., 8, see FIG. 4A or 4B). This PMI assumes a single-user transmission. CQI/RI is used with reference to the PMI.

Once the eNB receives this report along with the quantized DL channel, the eNB may infer the interference level experienced by the UE (whether it is wideband for 1-1 or narrowband for 2-1).

It is also possible for the eNB to restrict RI to either 1 or 2—either based on other configuration parameter(s) or the codebook subset restriction feature.

With aperiodic PUSCH-based reporting. In conjunction with explicit DL channel feedback, an aperiodic CSI reporting is configured. Similar to the periodic reporting, two possibilities exist:

Without PMI (mode 1-0, 2-0, or 3-0): Here RI signals a recommended transmission rank to the eNB (assuming a single-user transmission). The CQI can indicate a recommended spectral efficiency (MCS) assuming a given precoding at the eNB with a single-user transmission). This given precoding can either be a fixed precoding vector/matrix or a maximum ratio transmission (MRT) precoding vector/matrix.

Once the eNB receives this report along with the quantized DL channel, the eNB may infer the relative interference level experienced by the UE (whether it is wideband for 1-0 or narrowband for 2-0/3-0).

It is also possible for the eNB to restrict RI to either 1 or 2—either based on other configuration parameter(s) or the codebook subset restriction feature.

With PMI (mode 1-2, 2-1, 3-1, or 3-2): When PMI is included, a reference to the existing Rel.12 precoding codebooks (2-, 4-, or 8-antenna port codebooks) is used. Essentially, PMI is an index to a precoding matrix within a codebook. When the number of antenna ports associated with FD-MIMO is larger than 8 (which is most likely the case), the reported PMI can be utilized to signal a recommended precoding matrix/vector associated with the horizontal antenna array dimension (which does not exceed 8, see FIG. 4A or 4B). This PMI assumes a single-user transmission. CQI/RI is used with reference to the PMI.

Once the eNB receives this report along with the quantized DL channel, the eNB may infer the relative interference level experienced by the UE (whether it is wideband for 1-2 or narrowband for 2-1/3-1/3-2).

It is also possible for the eNB 102 to restrict RI to either 1 or 2—either based on other configuration parameter(s) or the codebook subset restriction feature.

Alternatively, the existing Rel.12 CSI reporting mechanism (modes) can be used to report primarily interference information (or in general, an indication of interference level) of the associated UE to the eNB. In this case, the CQI field can be used either to indicate a quantized interference power or to indicate a recommended MCS level (per Rel.12 CQI definition) assuming a pre-defined precoding (as discussed above) and/or transmission rank.

In addition to relying on the currently existing mechanism (as explained above), the explicit channel feedback contents also can be designed to include CQI/RI. As an example, consider a UE with 2 receive antennas (2-Rx)—although those skilled in the art will be able to extend the schemes below to any number of receive antennas.

eNB Implementation

Figure 9:
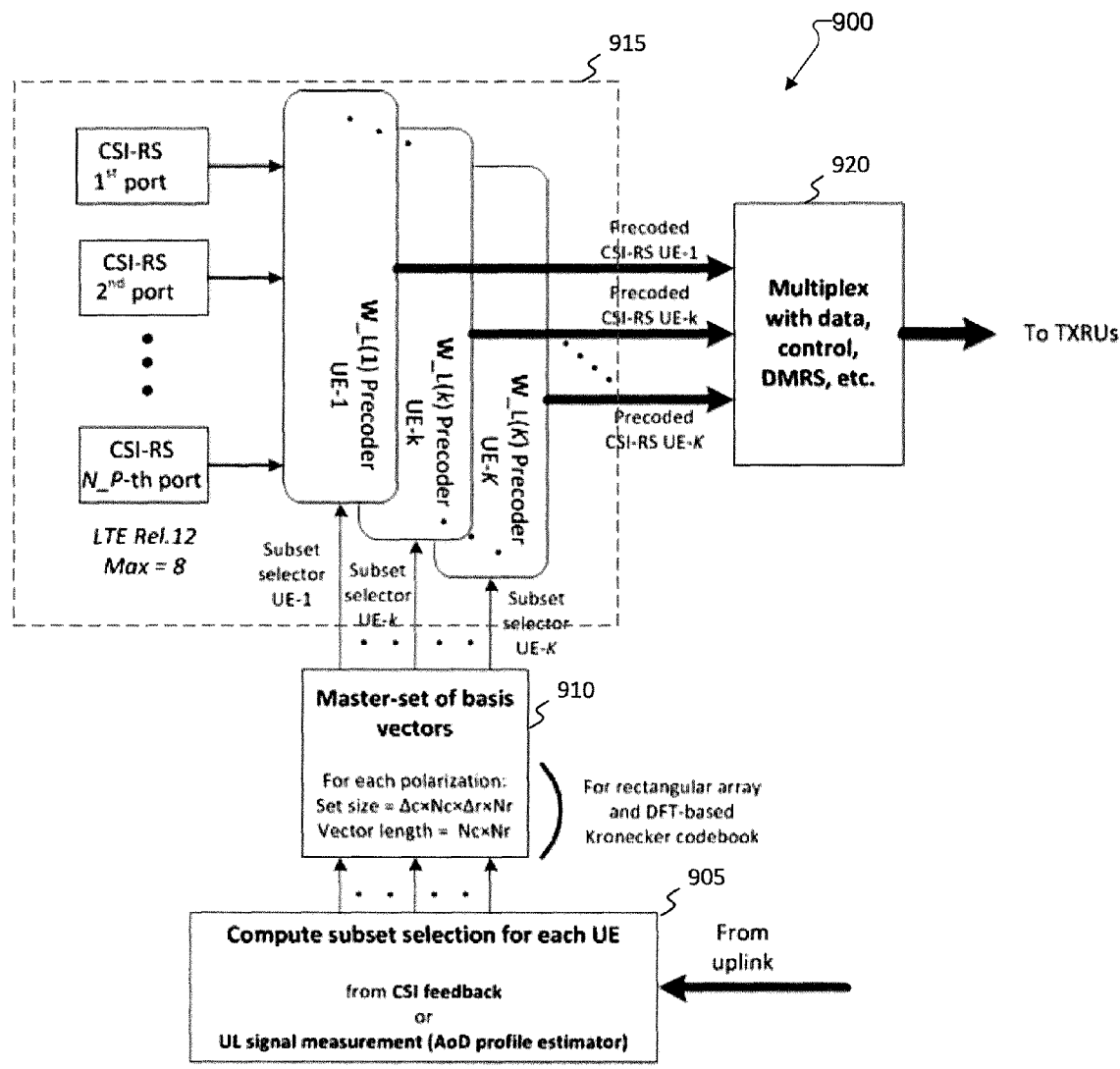
FIG. 9 illustrates an example embodiment of implementing CSI-RS resource allocation, partial precoding and multiplexing for the above partial precoding scheme according to this disclosure.

FIG. 9 illustrates an example embodiment of implementing CSI-RS resource allocation, partial precoding and multiplexing for the above partial precoding scheme. The embodiment shown in FIG. 9 is for illustration only. Other embodiments could be used without departing from the scope of the present disclosure.

Here, UE-specific precoding rather than CSI-RS resource-specific precoding is illustrated. The operation block diagram 900 for partial precoding CSI-RS is given as follows.

In subset selection block 905, given N_P CSI-RS antenna ports, each UE (say, UE-k) is allocated one or more CSI-RS resources. Precoding operation is performed by multiplying N_P CSI-RS antenna ports with a $N_{TX} \times N\_P$ precoding matrix $W_L$.

Embodiment 4-1

UE-specific precoding: For each UE (UE-k), a specific (partial) precoder is assigned. In this case, if UE-k is assigned multiple CSI-RS resources, one UE-specific precoder $W_L$ is used for all the assigned CSI-RS resources.

Embodiment 4-2

CSI-RS resource-specific precoding: Alternatively, for each CSI-RS resource assignment, a specific (partial) precoder is used. In this case, if UE-k is assigned multiple CSI-RS resources, one resource-specific precoder $W_L$ is used for each of the assigned CSI-RS resources—resulting in multiple precoders associated with UE-k.

In master-set of basis vectors block 910, a precoding matrix $W_L$ (UE-specific or resource-specific) is determined based on an associated subset selection and a fixed predetermined master-set of basis vectors or matrices. Given the subset selection for UE-k, the eNB chooses a subset within the master set to generate $W_L$. The subset selection is determined by the eNB based on either: 1) some eNB measurement of at least one UL signal, or 2) some CSI feedback from UE-k.

The first alternative may be used if UL-DL long-term reciprocity holds so that DL AoD profile or long-term DL channel statistics may be measured from at least one UL signal.

Embodiment 5-1

The eNB 102 schedules or configures UE-k to transmit at least one UL sounding reference signals (SRS). For example, upon measuring the SRS, the eNB estimates an UL AoA profile. This UL AoA profile is then translated to a DL AoD profile. This DL AoD profile is used by the eNB to determine subset selection.

Embodiment 5-2

Alternatively, the eNB 102 utilizes at least another UL signal different from UL SRS. Some examples are UL DMRS (demodulation reference signal), PUSCH, and/or PUCCH.

Embodiment 5-3

A combination of Embodiments 5-1 and 5-2 can be used. The second alternative can be used if a CSI feedback which is related to an associated DL AoD profile (which can be used by the eNB to derive $W_L$). Some examples include a PMI feedback indicating a recommended choice of $W_L$ (e.g. defined with respect to a codebook) and/or quantized and encoded values of AoDs.

Embodiment 5-4

One possibility is to use periodic CSI reporting based on PUCCH for reporting a PMI recommendation. Since $W_L$ is expected to vary slowly, it can be reported in the manner to similar to RI (in terms of its periodicity and PUCCH resource usage). For instance, for PUCCH mode 1-1 with submode 1, it is reported jointly with RI similar to Rel.10 W1. In this case, the eNB configures UE-k with one periodic CSI reporting mode along with its periodicity (via higher-layer signaling). Then, the eNB 102 receives the feedback periodically via PUCCH (or PUSCH, if the report is piggybacked into PUSCH to maintain single-carrier constraint).

Embodiment 5-5

Another possibility is to use aperiodic CSI reporting based on PUSCH. In this case, the eNB 102 sends an aperiodic CSI request/trigger in an UL grant to UE-k. After a specified number of subframes (TTIs), the eNB 102 receives the PMI recommendation on PUSCH.

At least one CSI-RS antenna port comprises a linear combination of a plurality of cell-specific CSI-RS ports, wherein the linear combination is responsive to a first feedback from the UE, or a measurement of an uplink transmission from the UE. A number of the linear combination of the plurality of cell-specific CSI-RS ports is responsive to a second feedback from the UE, or a measurement of an uplink transmission from the UE.

It is noted that the value of N_P (the number of CSI-RS antenna ports) can be fixed (static) or varied (semi-static or dynamic). If it can be varied, the number of CSI-RS antenna ports N_P may be selected based on AoD profile measurement and/or UE feedback (for details on selecting N_P, see: U.S. Provisional Patent Application Ser. No. 62/080,884, filed on Nov. 17, 2015, with the Title of PARTIALLY PRECODED CSI-RS (CHANNEL STATE INFORMATION REFERENCE SIGNAL) FOR ADVANCED WIRELESS COMMUNICATION SYSTEM ("REF3"), which is hereby incorporated into the present disclosure as if fully set forth herein; and U.S. Provisional Patent Application Ser. No. 62/086,488, filed on Dec. 2, 2014, with the Title of DOWNLINK SIGNALING FOR PARTIALLY PRECODED CSI-RS AND CSI FEEDBACK ("REF4"), which is hereby incorporated into the present disclosure as if fully set forth herein. Therefore, the choice of N_P is related to (even the same as) that of $W_L$ since N_P is the number of columns of $W_L$.

In precoder block 915, the assigned CSI-RS resources to respective UEs are precoded with the selected subset of basis functions/vectors.

In multiplexion block 920, once precoded, all the precoded CSI-RS resources are multiplexed with data, control signaling, DMRS, and other downlink signals. The resulting multiplexed signal is sent to all the TXRUs for transmission.

The master-set of basis vectors can be chosen to cover a wide range of antenna arrays. For instance, a rectangular array permits a representation of the MIMO channel as a linear combination of basis functions/vectors in the DFT phase domain. This is indicated in FIG. 6 (although exemplary). That is:

$$H^{(q,f)} \cong \sum_{k=k_0}^{k_0+K-1} \sum_{l=l_0}^{l_0+L-1} c_{k,l}^{(q,f)} B_{k,l} \qquad (9)$$

$$B_{k,l} = \frac{1}{\sqrt{N_r N_c}} \begin{bmatrix} 1 \\ \exp\left(j\frac{2\pi l}{\Delta_r N_r}\right) \\ \vdots \\ \exp\left(j(N_r-1)\frac{2\pi l}{\Delta_r N_r}\right) \end{bmatrix} \begin{bmatrix} 1 \\ \exp\left(j\frac{2\pi k}{\Delta_c N_c}\right) \\ \vdots \\ \exp\left(j(N_c-1)\frac{2\pi k}{\Delta_c N_c}\right) \end{bmatrix}^T \qquad (10)$$

In case of channels with multiple cones, Equations 9 and 10 applied to each of the plurality of cones. The parameters $\Delta_r$ and $\Delta_c$ in Equation 9 are oversampling factors (integers $\geq 1$, with 1 as a special case of non-overlapping DFT beams) which produce overlapping DFT beams. In that case, the master-set associated with Equation 9 and 10 is given as follows:

$$B_{k,l} = \frac{1}{\sqrt{N_r N_c}} \begin{bmatrix} 1 \\ \exp\left(j\frac{2\pi l}{\Delta_r N_r}\right) \\ \vdots \\ \exp\left(j(N_r-1)\frac{2\pi l}{\Delta_r N_r}\right) \end{bmatrix} \begin{bmatrix} 1 \\ \exp\left(j\frac{2\pi k}{\Delta_c N_c}\right) \\ \vdots \\ \exp\left(j(N_c-1)\frac{2\pi k}{\Delta_c N_c}\right) \end{bmatrix}^T, \qquad (11)$$

$$l = 0, 1, \ldots, \Delta_r N_r - 1,$$
$$k = 0, 1, \ldots, \Delta_c N_c - 1$$

As mentioned above, oversampling factors of 1 correspond to non-overlapping beams, i.e. critically-sampled DFT vectors. When $(\theta_{max}-\theta_{min})$ and $(\phi_{max}-\phi_{min})$ are relatively small, it is expected that $KL \ll N_r N_c$ (which results in some saving in feedback requirements).

Figure 10:
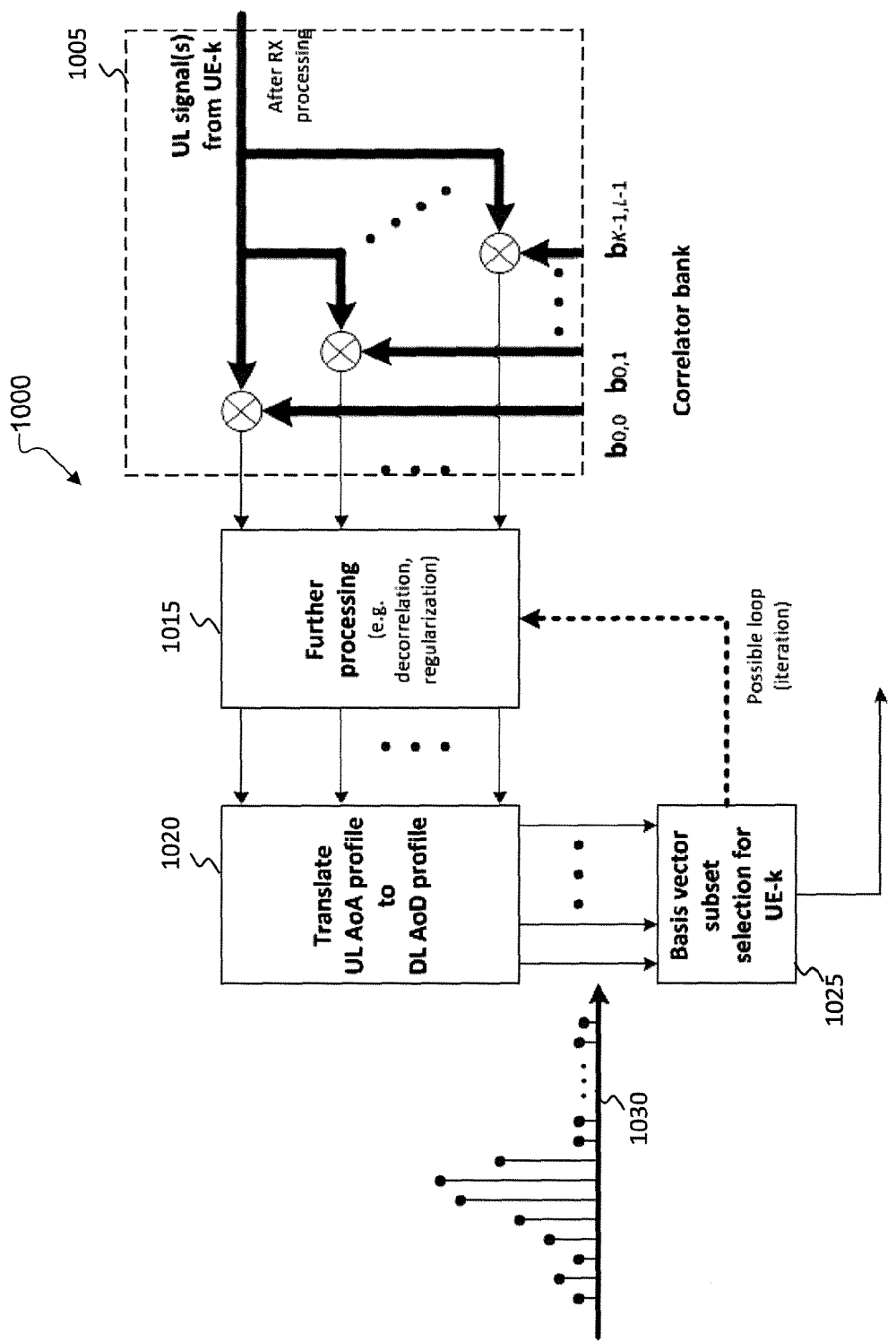
FIG. 10 is an example block diagram illustrating a basis vector subset selection process when UL-DL long-term reciprocity applies according to this disclosure.

FIG. 10 is an example block diagram illustrating a basis vector subset selection process when UL-DL long-term reciprocity applies. The embodiment shown in FIG. 10 is for illustration only. Other embodiments could be used without departing from the scope of the present disclosure.

The following embodiment applies when UL-DL long-term reciprocity can be assumed, e.g. when UL-DL duplex distance is sufficiently small. If the above DFT-based master-set is used, the eNB may estimate an UL AoA profile (to be translated into a DL AoD profile by exploiting UL-DL long-term reciprocity) using the same set of basis vectors as the precoding master-set.

In correlator block 1005, denoting the master-set of basis vectors as $S=\{b_{k,l}=\mathrm{vec}(B_{k,l})\}$, one or more than one UL signals from UE-k (see above master-set of basis vectors block 910, embodiments 5-1, 5-2, and 5-3) are received by the eNB and correlated with a correlator bank consisting of all the basis vectors in the set S. Here, vec(·) stacks all the column vectors of a matrix into one long vector.

In further processing block 1015, the output of the correlator bank may be further processed (e.g. for decorrelation or regularization). This generates a profile: correlation amplitude for each basis vector $b_{k,l}$. Here, decorrelation represents a typical least-square solution while regularization is simply regularized least-square. Decorrelation or regularization is not needed when all the basis vectors are orthogonal to one another.

In translator block 1020, the profile, which is an UL AoA profile, is processed, if necessary, to translate it into an estimate of DL AoD profile.

In basis vector subset selection block 1025, the eNB utilizes this profile to assign a subset selection for UE-k. This is done for all the UEs. For instance, the eNB can select the subset of basis vectors (representing DFT beams 1030) that are most closely aligned with the AoDs by utilizing a threshold over the AoD profile. Given a threshold, the basis vectors that result in sufficiently high (e.g. higher than the threshold value) correlation amplitude are included in the chosen subset.

It is also possible to repeat correlator block 1005 to basis subset selection block 1025 iteratively. This can be beneficial when decorrelation or regularization is used since weighting coefficients which are used for decorrelation tend to vary as additional basis vectors are added onto the previous (smaller) subset.

To exploit UL-DL long-term reciprocity, it is desirable that the eNB antenna array response associated with UL reception be matched with that associated with DL transmission (in regard of the array geometry, number of antenna elements, per-element response, etc.).

In practice, however, it may be customary to use only a subset of all the available antenna elements (which are available at the eNB) for UL reception. In this case, the size of the UL receiver array is smaller than the size of the DL transmitter array. While any subset of antenna elements can be chosen for composing the UL receiver array, the following example embodiments can be utilized.

Embodiment 6-1

A uniformly spaced subset of antenna elements with the same total aperture (hence increased inter-element spacing) can be chosen.

Embodiment 6-2

Alternatively, the same inter-element spacing can be preserved. In this case, this design results in a smaller array aperture.

Embodiment 6-3

It is also possible to vary the subset of antenna elements over time according to a chosen (predetermined) pattern at the eNB. In this case, the correlator bank at the eNB varies over time and so does its output. The time-varying output can be processed (for instance, using filtering or interpolation/extrapolation algorithm) to estimate a DL AoD profile with finer resolution.

For example, all the available antenna elements or TXRUs at the eNB (which are all used for DL transmission) may be partitioned into P array subsets where each array subset is used for a given time. The time-varying pattern performs hopping from one array subset to another until all the P subsets are covered within a given amount of time.

Within such time period, the eNB utilizes filtering interpolation/extrapolation algorithm(s) to derive a DL AoD profile with finer resolution.

This scheme requires switching in the antenna element (RF) level. Here there are at least two possibilities:

Physical antenna ports being virtualized into multiple fixed (non-configurable) sub-arrays where the eNB may switch from one sub-array to another across one time period of UL AoA profile measurement.

Physical antenna ports being virtualized into multiple reconfigurable sub-arrays (e.g. using reconfigurable RF combiners/dividers) where the eNB may switch from one sub-array to another across one time period of UL AoA profile measurement.

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A Base Station (BS) comprising:
a transceiver; and
a processor configured to:
   allocate at least one CSI-RS antenna port to a User Equipment (UE);
   precode the at least one CSI-RS antenna port with a first precoding matrix;
   cause the transceiver to transmit the at least one CSI-RS antenna port precoded with the first precoding matrix through a channel to the UE;
   cause the transceiver to signal a number of the at least one CSI-RS antenna port to the UE;
   cause the transceiver to receive an index for a second precoding matrix from the UE; and
   precode data transmission with the first precoding matrix and the second precoding matrix,
wherein a codebook for the second precoding matrix is determined according to the number of the at least one CSI-RS antenna port.

2. The base station of claim 1, wherein the number of the at least one CSI-RS antenna port is transmitted to the UE via a semi-static or dynamic signaling, wherein the second precoding matrix is determined by the UE according to the at least one CSI-RS antenna port precoded with the first precoding matrix as received through the channel by the UE and the signaled number of the at least one CSI-RS antenna port.

3. The base station of claim 1, wherein the at least one CSI-RS antenna port comprises a linear combination of a plurality of cell-specific CSI-RS ports, wherein the linear combination is responsive to a first feedback from the UE, or a measurement of an uplink transmission from the UE.

4. The base station of claim 3, wherein a number of the linear combination of the plurality of cell-specific CSI-RS ports is responsive to a second feedback from the UE, or a measurement of an uplink transmission from the UE.

5. The base station of claim 1, wherein the first precoding matrix is a long term wideband precoding matrix, and the second precoding matrix is a short term precoding matrix.

6. The base station of claim 1, wherein the index for the second precoding matrix included in a CSI feedback is reported to the BS via either a Physical Downlink Control CHannel (PUCCH) on basis of a periodic reporting or a Physical Uplink Shared Channel (PUSCH) on basis of an aperiodic reporting.

7. A method for operating a User Equipment (UE), the method comprising:
   receiving at least one CSI-RS antenna port precoded with a first precoding matrix through a channel from a Base Station (BS);
   receiving a signaling comprising a number of the at least one CSI-RS antenna port from the BS;
   determining a second precoding matrix according to the at least one CSI-RS antenna port precoded with the first precoding matrix as received through the channel by the UE, and the signaled number of the at least one CSI-RS antenna port;
   transmitting an index for the determined second precoding matrix to the BS; and
   receiving data transmission with the first precoding matrix and the second precoding matrix from the BS,
wherein a codebook for the second precoding matrix is determined according to the number of the at least one CSI-RS antenna port.

8. The method of claim 7, wherein the number of the at least one CSI-RS antenna port is transmitted to the UE via a semi-static or dynamic signaling.

9. The method of claim 7, wherein the at least one CSI-RS antenna port comprises a linear combination of a plurality of cell-specific CSI-RS ports, wherein the linear combination is responsive to a first feedback from the UE, or a measurement of an uplink transmission from the UE.

10. The method of claim 9, wherein a number of the linear combination of the plurality of cell-specific CSI-RS ports is responsive to a second feedback from the UE, or a measurement of an uplink transmission from the UE.

11. The method of claim 7, wherein the first precoding matrix is a long term wideband precoding matrix, and the second precoding matrix is a short term precoding matrix.

12. The method of claim 7, wherein the index for the second precoding matrix included in a CSI feedback is reported to the BS via either a Physical Downlink Control CHannel (PUCCH) on basis of a periodic reporting or a Physical Uplink Shared Channel (PUSCH) on basis of an aperiodic reporting.

13. A User Equipment (UE) comprising:
a transceiver; and
a processor configured to:
   cause the transceiver to receive at least one CSI-RS antenna port precoded with a first precoding matrix through a channel from a Base Station (BS);
   cause the transceiver to receive a signaling comprising a number of the at least one CSI-RS antenna port from the BS;
   determine a second precoding matrix according to the at least one CSI-RS antenna port precoded with the first precoding matrix as received through the channel by the UE, and the signaled number of the at least one CSI-RS antenna port;
   cause the transceiver to transmit an index for the determined second precoding matrix to the BS; and
   cause the transceiver to receive data transmission with the first precoding matrix and the second precoding matrix from the BS,
wherein a codebook for the second precoding matrix is determined according to the number of the at least one CSI-RS antenna port.

14. The UE of claim 13, wherein the number of the at least one CSI-RS antenna port is transmitted to the UE via a semi-static or dynamic signaling.

15. The UE of claim 13, wherein the at least one CSI-RS antenna port comprises a linear combination of a plurality of cell-specific CSI-RS ports, wherein the linear combination is responsive to a first feedback from the UE, or a measurement of an uplink transmission from the UE.

16. The UE of claim 15, wherein a number of the linear combination of the plurality of cell-specific CSI-RS ports is responsive to a second feedback from the UE, or a measurement of an uplink transmission from the UE.

17. The UE of claim 13, wherein the index for the second precoding matrix included in a CSI feedback is reported to the BS via either a Physical Downlink Control CHannel (PUCCH) on basis of a periodic reporting or a Physical Uplink Shared Channel (PUSCH) on basis of an aperiodic reporting.

* * * * *